(12) United States Patent
Koyanagi et al.

(10) Patent No.: US 7,840,063 B2
(45) Date of Patent: Nov. 23, 2010

(54) IMAGE PROCESSING APPARATUS

(75) Inventors: Katsuya Koyanagi, Ebina (JP);
Masahiko Otsu, Ebina (JP); Masato Saito, Ebina (JP); Kazuo Hayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1175 days.

(21) Appl. No.: 11/389,840

(22) Filed: Mar. 27, 2006

(65) Prior Publication Data

US 2007/0018995 A1 Jan. 25, 2007

(30) Foreign Application Priority Data

Jul. 20, 2005 (JP) ............................. 2005-210174

(51) Int. Cl.
| | |
|---|---|
| G06K 9/00 | (2006.01) |
| G06K 9/34 | (2006.01) |
| G06K 9/36 | (2006.01) |
| G06K 9/46 | (2006.01) |

(52) U.S. Cl. ..................... 382/162; 382/164; 382/232
(58) Field of Classification Search ................. 382/164, 382/162, 232
See application file for complete search history.

(56) References Cited

U.S. PATENT DOCUMENTS

| | | | | |
|---|---|---|---|---|
| 2004/0095601 | A1* | 5/2004 | Ozawa ....................... | 358/1.15 |
| 2004/0096102 | A1* | 5/2004 | Handley .................... | 382/164 |
| 2004/0260935 | A1* | 12/2004 | Usami et al. ............... | 713/193 |

FOREIGN PATENT DOCUMENTS

| | | |
|---|---|---|
| JP | 2000113160 | 4/2000 |
| JP | 200261676 | 9/2000 |
| JP | 2000261676 | 9/2000 |
| JP | 2001285653 | 10/2001 |
| JP | 2004282279 | 10/2004 |
| JP | 2005065327 | 3/2005 |

OTHER PUBLICATIONS

Japanese Notice of Grounds for Rejection with English translation thereof; relating to Japanese Application No. 2005-210174 issued on Oct. 27, 2009.

* cited by examiner

*Primary Examiner*—Bhavesh M Mehta
*Assistant Examiner*—Bernard Krasnic
(74) *Attorney, Agent, or Firm*—Gauthier & Connors LLP

(57) ABSTRACT

An image processing apparatus has an image input section, a color image processor, a monochrome image processor and an image synthesizer. The image input section inputs image data of an original image. The color image processor generates color image data by performing color image processing on the image data. The monochrome image processor generates monochrome image data by performing monochrome image processing on the image data. The image synthesizer generates synthesized image data by synthesizing the monochrome image data with the color image data. The apparatus also has a buffer that temporarily stores image data, a determination section that determines on the basis of the image data of the original image whether the original image is color or monochrome, and an output controller that controls an image output process. The output controller outputs output color or monochrome image data fetched from the buffer as determined to be appropriate.

7 Claims, 3 Drawing Sheets

IMAGE PROCESSING APPARATUS

PRIORITY INFORMATION

This application claims priority to Japanese Patent Application No. 2005-210174, filed on Jul. 20, 2005, which is incorporated herein by reference in its entirety.

BACKGROUND

1. Technical Field

The present invention relates to an image processing apparatus for scanning an original image on a medium and obtaining image data to display the image, and more particularly to an image processing apparatus for determining whether the original image is a color image or monochrome image and obtains image data that has undergone image processing suitable for color if the original image is color or obtains image data that has undergone image processing suitable for monochrome if the original image is monochrome.

2. Related Art

It is well known that whereas tone reproduction is important for color images that typify photographs and halftone images, optical density contrast and edge sharpness are important for monochrome (typically black and white) images that typify character-based document images. On the other hand, there are some image forming apparatuses, such as a digital color copiers, that are provided with an auto color select (ACS) function to automatically determine whether the original image is a color image or a monochrome image and to automatically switch the type of image processing in accordance with the result of the determination. The ACS function is also called a color/monochrome auto-switching function.

The pre-scan system has been known a long time as an ACS system in color image forming apparatuses. In this system, by scanning the image of a document prior to an image forming operation, such as copying, the original image can be determined to be color or monochrome and a selection is made as to which image processing for color or monochrome is applicable in accordance with the result of the determination before an image forming operation is performed.

However, a problem in the pre-scan system is that the start of the image forming operation is delayed since a certain amount of time is required for the pre-scan. Thus, systems have been proposed for implementing the ACS function without pre-scan, such as Japanese Patent Laid-Open Publication No. 2001-285653 (referred to hereinafter as document 1) and Japanese Patent Laid-Open Publication No. 2000-261676 (referred to hereinafter as document 2).

In the apparatus given in document 1, the YMCK image data for color image formation and the K image data for black and white image formation are generated in parallel from the input RGB image data, for example, and are temporarily stored in the page memory. If the result of the ACS determination is color or black and white, the YMCK image data or the K image data for black and white image formation is retrieved from the respective page memory and used for image formation.

Document 2 also shows a system that scans an original in a scan mode with the largest amount of data (such as color mode) and subsequently converts the scanned data as needed to a data to accommodate the type of original (such as grayscale mode or binary monochrome mode).

The system of document 1 has a problem where a high capacity page memory (buffer) is required since the YMCK image data for color image formation and the K image data for black and white image formation are stored in the page memory.

The system of document 2 requires less page memory capacity than the system of document 1 since only the scanned data for the color mode is stored. However, in this system, if the original is black and white, the raw scanned data is not used. Instead, a monochrome image is generated from data of the color mode that has undergone image processing for color. Therefore, this has a problem where the resulting monochrome image has an image quality that differs from when image processing for monochrome is directly performed on the raw scanned data. Furthermore, the image processing for color that has already been performed may adversely affect the image quality of the image processed result when the monochrome image is generated.

The present invention provides, in an apparatus for performing ACS processing in parallel with image processing, a system that can execute processing with a relatively small buffer capacity and ensure the image quality of monochrome images.

SUMMARY

The image processing apparatus relating to the present invention includes an image input section that inputs image data of an original image, a color image processor that generates color image data by performing color image processing on the image data of the original image, a monochrome image processor that generates monochrome image data having a bit size per pixel smaller than the color image data by performing monochrome image processing on the image data of the original image, an image synthesizer that generates synthesized image data having a bit size per pixel equivalent to that of the color image data by synthesizing the monochrome image data with the color image data, a buffer that temporarily stores image data, a determination section that determines on the basis of the image data of the original image whether the original image is color or monochrome, and an output controller that controls an image output process in accordance with a specified mode where the output mode controller stores the output image data of the image synthesizer into the buffer in the auto color select mode, and if the determination section has determined that the original image is color, the image data fetched from the buffer is output, and if the determination section has determined that the original image is monochrome, the monochrome image data is sampled from the image data fetched from the buffer and then output.

BRIEF DESCRIPTION OF THE DRAWINGS

These and other aspects of the disclosure will become apparent from the following description read in conjunction with the accompanying drawings wherein the same reference numbers have been applied to like parts and in which.

DETAILED DESCRIPTION

Figure 1:
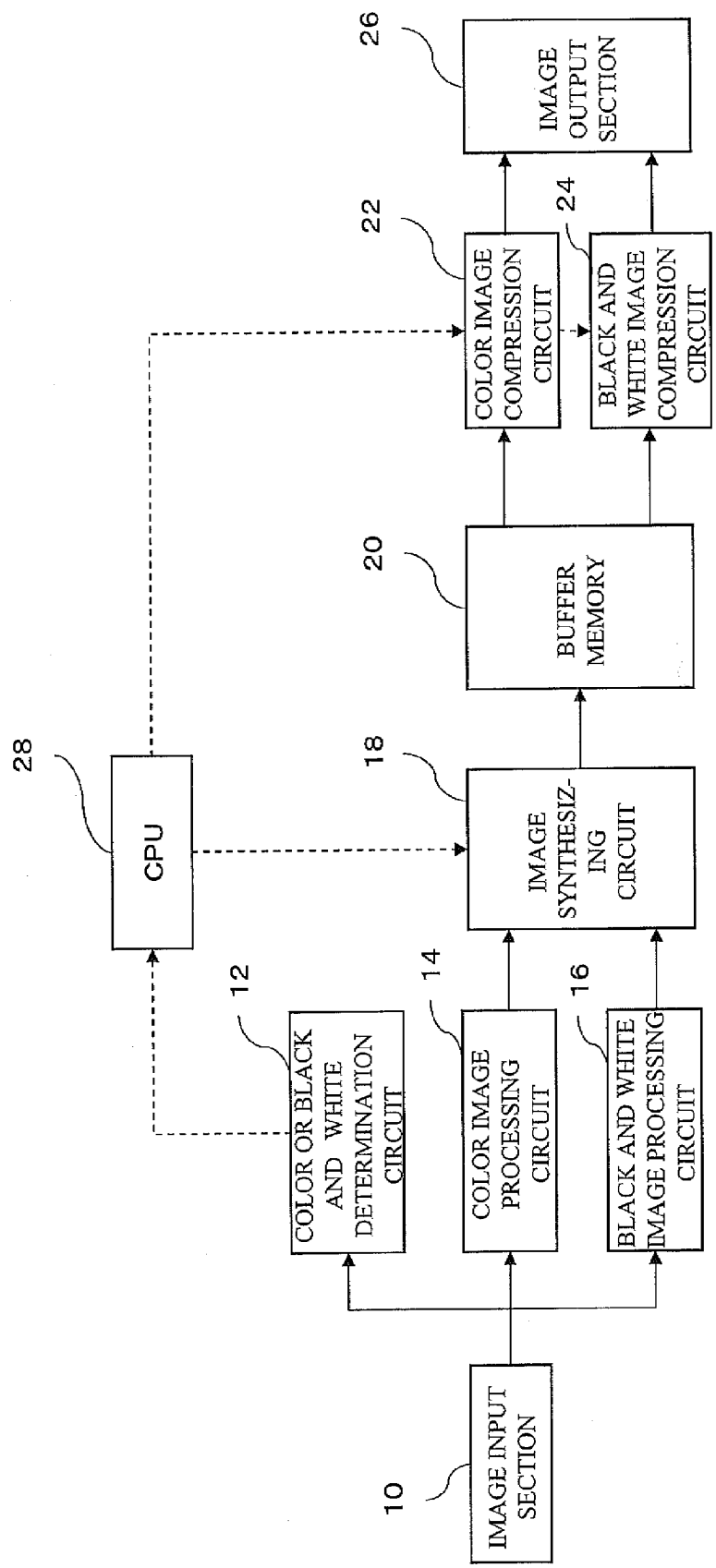
FIG. 1 is a block diagram showing a configuration example of an image processing apparatus relating to the present invention.

FIG. 1 is a block diagram showing a configuration example of an image processing apparatus relating to the present invention. Documents 1 and 2 showed ACS (auto color select) in an image formation apparatus, such as for a digital multifunction device. The example here mainly illustrates a process for scanning an original and creating an image file.

An image input section 10 is an image data source for generating image data to be processed and is, for example, a full-color scanner for optically scanning an original image. The image input section 10 outputs raster image data in full-color. In an ordinary scanner, RGB data for every pixel in every fast scan line is output in sequence in the slow scan direction. The raster image data that was generated by the image input section 10 is simultaneously input in parallel by a color or black and white determination circuit 12, a color image processing circuit 14, and a black and white image processing circuit 16.

From the raster image data that is input in sequence as the scan progresses, the color or black and white determination circuit 12 determines whether the original image is color or black and white. The determination system in this embodiment does not use the pre-scan system but dynamically determines whether the original is color or black and white as the scan of the original progresses. In this determination, the original image is determined to be color if even one color image part is detected within the original image. The original image is determined to be black and white if no color image part is found after the entire original image has been scanned. The determination of color or black and white is undetermined until a color image part is found during the scan. Various known methods for this determination or a known circuit configuration for performing this determination may be used.

The color image processing circuit 14 generates color image data by performing known image processes for color image generation, such as color space conversion and tone correction, on the full-color raster image data supplied from the image input section 10. The color image data has multiple chrominance components (such as the R (red), G (green), and B (blue) components in a RGB color system or the Y (luminance) and the Cb (Y-B) and Cr (Y-R) components in a YCbCr system) and bit-mapped image data of multiple values (such as 8 bits) for every pixel for every chrominance component. For example, if this image processing apparatus is for creating JPEG (Joint Photographic Experts Group) image files from scanned images, the color image processing circuit 14 converts the color space of the RGB input image data into YCbCr data formed from luminance (Y) and chrominance (Cb, Cr) components. Furthermore, image processing is performed to match the user-set parameters or conditions, such as tone reproduction curve.

The black and white image processing circuit 16 generates black and white image data by performing known image processes for black and white (binary) image generation, such as noise removal and binarization, on the raster image data supplied from the image input section 10. The black and white image data has one bit of bit-mapped image data per pixel.

The color image processing circuit 14 and the black and white image processing circuit 16 simultaneously process in parallel the raster image data supplied from the image input section 10 and the processed results are respectively input by an image synthesizing circuit 18. Namely, the image synthesizing circuit 18 simultaneously inputs a color image processed result and a black and white image processed result for the same pixel in the original image. It should be noted that various known processes or various known circuit configurations may be used for the color image processing circuit 14 and the black and white image processing circuit 16.

The image synthesizing circuit 18 accepts and synthesizes the color image data that is input from the color image processing circuit 14 and the black and white image data that is input from the black and white image processing 16. In a preferable example, within the image data for every chrominance component that is output from the color image processing circuit 14, the image synthesis is performed by substituting a specific bit value of data in every pixel of the image data for a specific color component with a one-bit data corresponding to the black and white image data. The specific bit to be replaced is preferably the least significant bit (LSB) so as to minimize the degradation of the color image data. Furthermore, a color component for which the sensitivity is high in terms of human visual characteristics should be avoided for the synthesizing process. Since human visual characteristics are more sensitive to changes in the luminance component than to changes in the chrominance component, it is preferable to synthesize the black and white image data with Cb or Cr for color image data in the YCbCr system. Furthermore, in the RGB system, since the G component greatly contributes more to the luminance than the B component or the R component, it is preferable to synthesize the black and white image with B or R.

The image synthesizing process at the image synthesizing circuit 18 substitutes a bit in a color component of the color image data with a black and white image. Thus, the data size of the synthesized image data, which is the synthesized result, is the same as the data size of the color image.

Furthermore, in addition to the synthesized output mode for performing the above-mentioned synthesizing process, the image synthesizing circuit 18 has a color output mode for directly outputting the color image data that is input from the color image processing circuit 14 and a black and white output mode for directly outputting the black and white image data that is input from the black and white image processing circuit 16. These output modes are switched by control of a CPU (central processing unit) 28. Namely, the black and white output mode is selected if black and white output has been specified by the user, the color output mode is selected if color output has been specified, and the synthesized output mode is selected if auto color select (ACS) has been specified.

The output image data of the image synthesizing circuit 18 is stored into a buffer memory (page memory) 20. Since the synthesized image data has the same size as the color image data in this embodiment even when performing ACS, storing to the buffer memory 20 requires a smaller capacity buffer memory compared to the system in document 1 where both the color image and the black and white image are stored into the buffer memory.

In accordance to control of the CPU 28, the image data stored in the buffer memory 20 is supplied to either a color image compression circuit 22 or a black and white compression circuit 24. The color image compression circuit 22 is selected when the original image is color and performs a lossy compression process, such as JPEG, which is suitable for the data compression of continuous tone color images, for the color image data that is supplied from the buffer memory 20. The black and white compression circuit 24 is selected when the original image is black and white and performs a compression process, such as MMR, which is suitable for the compression of binary images, for the binary black and white image data that is supplied from the buffer memory 20.

Known methods or circuits may be used for these compression circuits 22 and 24. These circuits 22 and 24 are provided to reduce the amount of data when the scanned result of the original image is stored into an image file.

The CPU 28 selects the color image compression circuit 22 as the supply source of the data within the buffer memory 20 when the user specifies color output and selects the black and white compression circuit 24 when the user specifies black and white.

Furthermore, when the user specifies ACS, the color or black and white determination circuit 12 determines the type (color or black and white) of the original image simultaneously while the output of the image synthesizing circuit 18 is being stored into the buffer memory 20 as the scan progresses. Then, when the determination result is output, the CPU 28 controls the fetching of data from the buffer memory 20 in accordance with the determination result. Namely, if the image has been determined to be color, the CPU 28 supplies the image data within the buffer memory 20 to the color image compression circuit 22. On the other hand, if the image has been determined to be black and white, the CPU 28 causes the least significant bit of each pixel (which forms the black and white image data) in the image data stored in the buffer memory 20 to be output and then processed by the black and white image compression circuit 24.

An image output section 26 creates an image file by performing a predetermined process, such as for adding attribute data, on the compressed image data that is output from the color image compression circuit 22 or the black and white image compression circuit 24. The created image file is provided to the user as the processed result.

The CPU 28 executes a control program for controlling the above-mentioned processes.

Figure 2:
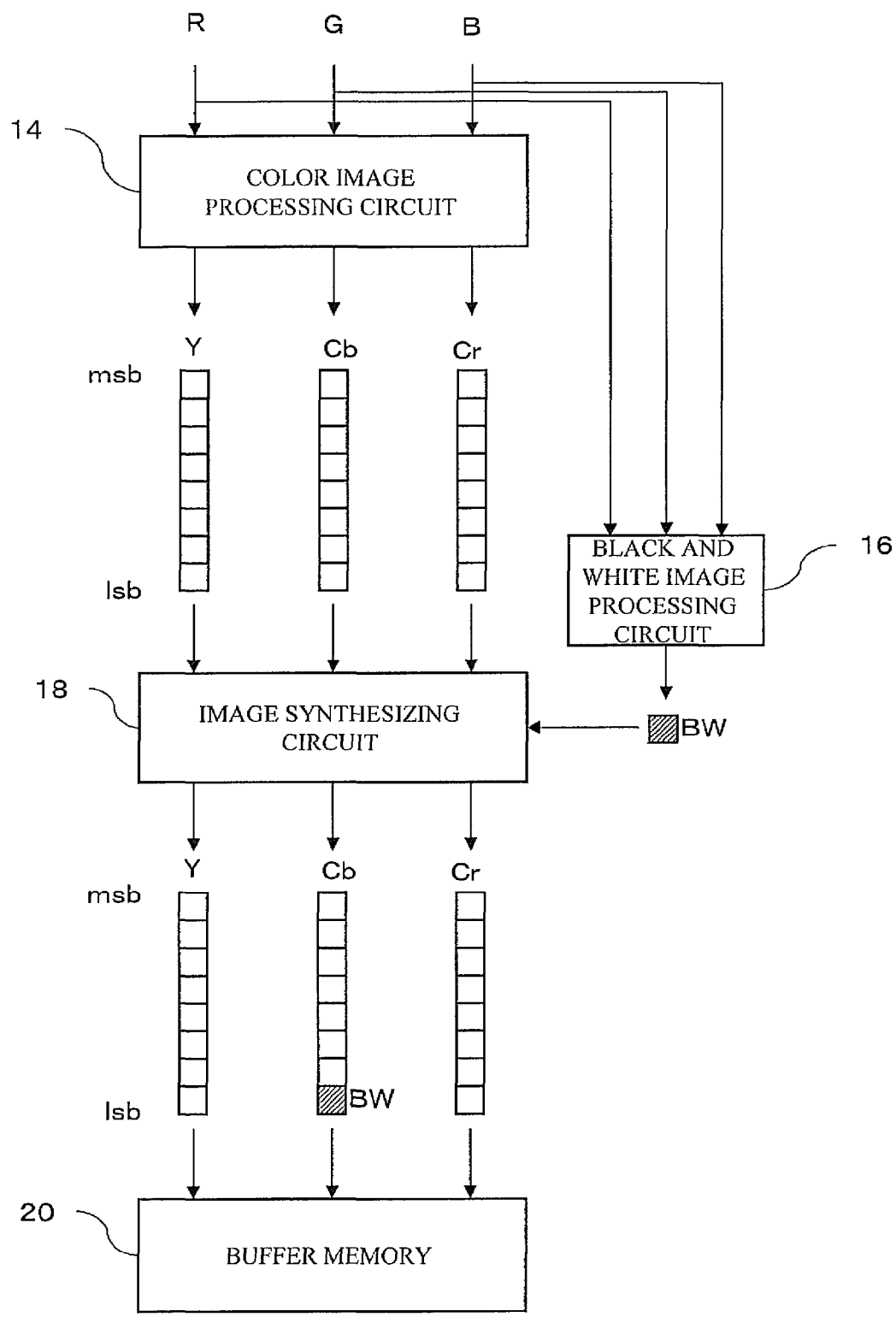
FIG. 2 illustrates the transition of image data in the case where the system of an embodiment is applied to the process for scanning a document with a scanner and generating a JPEG file.

The transition of the image data is described with the image processing apparatus of this embodiment applied to the process of scanning an original with a scanner and generating a JPEG file. In this example, as shown in FIG. 2, RGB raster image data having 8 bits per pixel per color is input in sequence by the color image processing circuit 14 and the black and white image processing circuit 16 as the scan progresses. The color image processing circuit 14 performs a predetermined color image process on the RGB image data and generates YCbCr image having an 8-bit width per pixel per color. The black and white image processing circuit 16 generates binary (black and white) image data having one bit per pixel from the RGB image data. The image synthesizing circuit 18 substitutes the least significant bit of Cb data pixel value of the YCbCr image with the bit value of the corresponding pixel of the binary (black and white) image and stores it into the buffer memory 20. Then, a data compression process is performed in accordance with the JPEG standard by the color image compression circuit 22 on the YCbCr image that was stored in the buffer memory 20 to generate a JPEG file.

According to the image processing apparatus described above, the ACS process can be executed without pre-scan and the required capacity of the buffer memory 20 can be decreased since the size of the synthesized image data that is stored in the buffer memory 20 during ACS is the same as the size of the color image data. In the system of this embodiment, the black and white image data that is output when the image has been determined to be black and white as a result of ACS differs from the black and white image that is generated from the image data after performing color image processing as described in document 2 and is the direct result of image processing for black and white image generation on a raw raster image that is output from the image input section 10.

In the system of this embodiment, the image data that is output when the image has been determined to be color as a result of ACS is synthesized image data, which has been modified from the original color image data. However, this modification applies to color components of the color image having minimal influence in terms of human visual characteristics. Furthermore, since only the least significant bit is substituted, the modification of pixels values is minimized. Therefore, degradation of the image due to the synthesizing process is hardly noticeable. Moreover, if a lossy image compression, such as JPEG, is performed on the output image data, the degradation is even less noticeable.

Furthermore, in JPEG compression, sampling is performed to reduce the number of pixels to ¼ so that the data values for four adjacent pixels (2×2 square) for the chrominance components Cb and Cr for which visual sensitivity at the high frequency components is low are averaged to create the data for one pixel. Thus, even if the least significant bit of a chrominance component is changed from its original value due to the synthesizing process, its influence is only ¼. Furthermore, there are instances where the changes in the four adjacent pixels cancel each other so that the compressed result is almost the same as the compressed result of the original color image.

In the above-mentioned example, the synthesized image data was stored into the buffer memory 20 if ACS was specified. A modification of this example will be described next.

Figure 3:
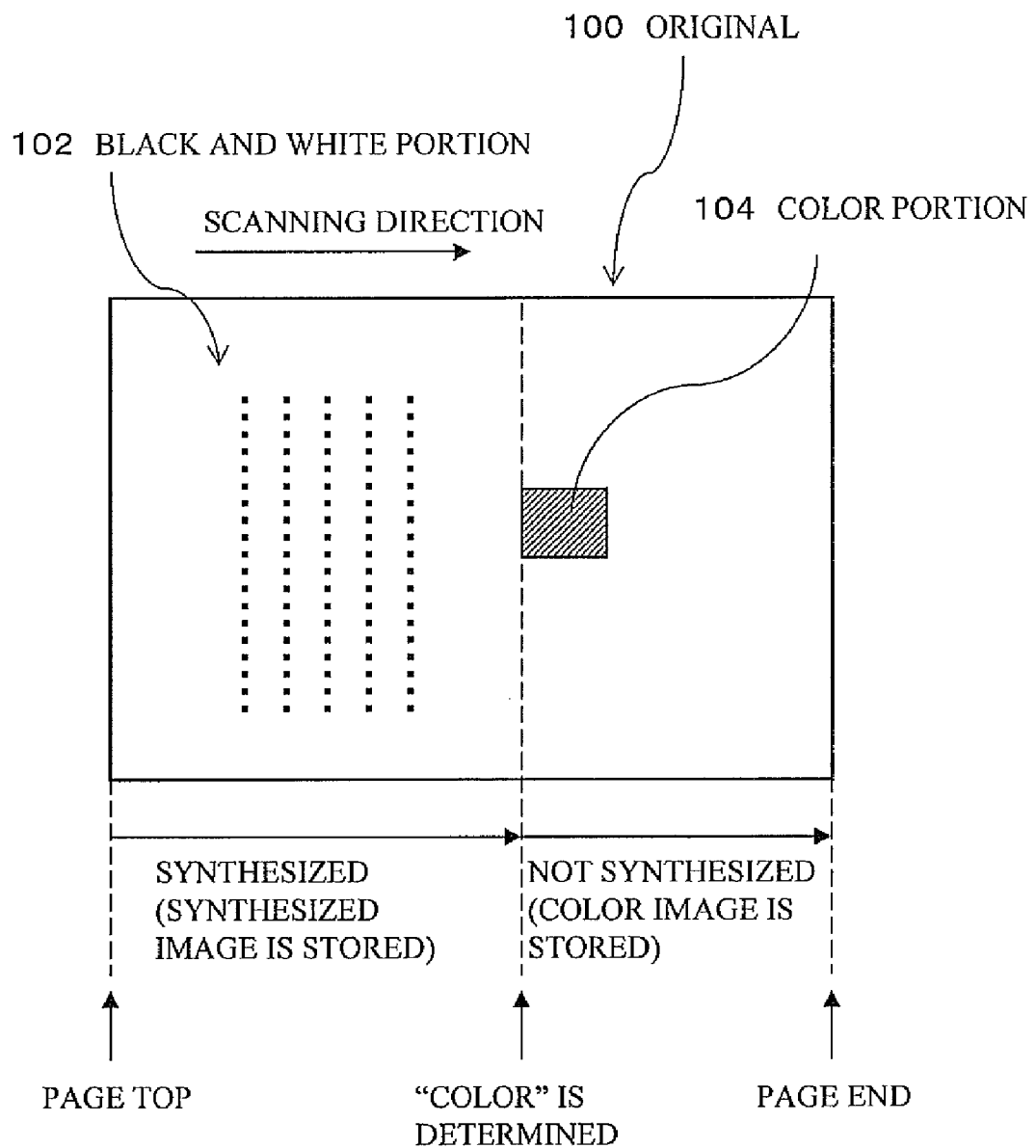
FIG. 3 shows an example for switching the output mode of an image synthesizer circuit within a page during ACS.

In this modified example, as shown in FIG. 3, in a process where the color or black and white determination circuit 12 determines the type of an original 100 on the basis of sequentially scanned pixel data, the CPU 28 operates the image synthesizing circuit 18 in the synthesizer output mode until color is determined from the top of the page. During this time, the original 100 only has a black and white (grayscale) portion 102 and a color portion has not been detected. Then, when a color portion 104 is scanned and the original 100 has been determined to be color, the CPU 28 switches the image synthesizing circuit 18 to the color output mode. Through this control, the synthesized image data, from the top of the page to the line where color was determined, and the color image data, from that line until the end of the page, are stored into the buffer memory 20. As a result, since the portion of the page from where color was determined is not synthesized image data but original color image data, the image quality improves.

In this case, the image data of one page includes both a synthesized image data part and a color image data part. However, as explained above, the synthesized image data in this embodiment is extremely similar to the color image data so that the difference therebetween is not noticeable.

The embodiments above illustrated the image processing apparatus performing a process for creating compressed image data from the scanned image. However, the present invention is not limited to this type of processing. For example, an instance can be considered where image compression is not performed in which case the color image compression circuit 22 and the black and white image compression circuit 24 are unnecessary. Furthermore, the present invention is applicable to image forming apparatuses, such as digital copiers, digital multifunction devices, and printers. In this case, the image forming apparatus generates a YMCK color image and a black and white binary image from the scanned raster image and a black and white binary image is synthesized with a color component of the former.

The image processing apparatus of the above-mentioned embodiment outputs binary data as black and white image data. However, the Y component image data in a YCbCr color image data can also be output as black and white multiple-value (grayscale) image.

Furthermore, the application of the present invention is limited not only to images that have been scanned on a scanner. The configurations of the above-mentioned embodiments can be understood by those skilled in the art to be applicable in creating an output image file from raster image data obtained via a portable recording medium or network.

Moreover, in the examples above, the black and white image data was embedded into the color component having minimal influence on the luminance in the color image data. However, the present invention is not limited to this. Even if data is embedded into a component having a strong influence on the luminance, only the least significant bit is influenced so that degradation of the overall image is minimal in this case also.

Furthermore, in the examples above, binary black and white image data was synthesized with color image data. However, the black and white image data to be synthesized may be multiple values. In this case, with the bit size of one pixel of the multiple value black and white data set to M, the bits up to the Mth digit from the least significant bit of one color component of the color image data may be substituted with the corresponding pixel data of the multiple-value black and white image. However, this assumes the bit size of one color component of the color image data is larger than M.

Moreover, when embedding the multiple-value black and white image data into the color image data, the data for one pixel of the black and white image is systematically divided into multiple parts and the divided data may be distributed and embedded with respect to multiple color components of the color image data. In this case, the data for each color component is substituted with black and white image data up to the digit of the divided data from the least significant bit. Thus, the change in each color component can be suppressed and the multiple-value black and white image data can be embedded.

Although a preferred form of the present invention has been described in its form with a certain degree of particularity using specific examples, it is to be understood that the invention is not limited thereto. It is further understood by those skilled in the art that various changes and modifications may be made in the invention without departing from the spirit and scope thereof.

What is claimed is:

1. An image processing apparatus comprising:
    an image input section that inputs image data of an original image;
    a color image processor that generates color image data by performing color image processing on the image data;
    a monochrome image processor that generates monochrome image data by performing monochrome image processing on the image data, the monochrome image data having a bit size per pixel smaller than the color image data;
    an image synthesizer that generates synthesized image data by synthesizing the monochrome image data with the color image data, the synthesized image data having a bit size per pixel equivalent to the color image data;
    a determination section that determines on a basis of the image data of the original image whether the original image is color or monochrome;
    a buffer that temporarily stores the synthesized image data when the image processing apparatus is in an auto color select (ACS) mode; and
    an output controller that controls an image output process, wherein the output controller stores output image data outputted by the image synthesizer into the buffer when an auto color select mode is selected, and the output controller outputs output image data fetched from the buffer when the determination section has determined that the original image is color, and the output controller outputs the monochrome image data that is sampled from the image data fetched from the buffer when the determination section has determined that the original image is monochrome, wherein
    the image synthesizer synthesizes the monochrome image data with the color image data by substituting least significant bits up to a predetermined digit of each pixel in the color image data with the corresponding pixel data of the monochrome image data, and wherein
    the output controller, while scanning an image of one page in the auto color select mode, controls whether or not to perform synthesis of the monochrome image data with the color image data at the image synthesizer in accordance with the determination of the determination section, and wherein the output controller, while scanning an image of one page in the auto color select mode, stores output synthesized image data of the image synthesizer until the determination section determines that the image is color, and subsequent to the point when the determination section determines that the image is color, stores output color image data of the color image processor into the buffer.

2. The image processing apparatus according to claim 1, wherein:
    the color image processor generates color image data composed of luminance and chrominance components from the image data of the original image; and
    the image synthesizer substitutes least significant bits up to a predetermined digit of data of one or more chrominance components of each pixel of the color image data with the corresponding pixel data of the monochrome image data.

3. The image processing apparatus according to claim 2, wherein:
    the output controller performs an image compression process, which includes chrominance component sub-sampling, on image data fetched from the buffer and outputs the result thereof.

4. The image processing apparatus according to claim 1, wherein:
    the image synthesizer substitutes least significant bits up to a predetermined digit of a color component having minimal influence on the luminance compared to other color components among a plurality color components of each pixel of the color image data with the corresponding pixel data of the monochrome image data.

5. The image processing apparatus according to claim 1, wherein the monochrome image processor generates one bit of monochrome image data per pixel.

6. The image processing apparatus according to claim 1, wherein the output controller performs a glossy image compression process on the image data fetched from the buffer and outputs the result thereof.

7. The image processing apparatus according to claim 1, wherein the image synthesizer divides data of each pixel of the monochrome image data into multiple parts and distributes the multiple parts into two or more components of the color components of the corresponding pixel of the color image data of each division.

* * * * *